(12) United States Patent
Ceccarani et al.

(10) Patent No.: US 8,940,837 B2
(45) Date of Patent: Jan. 27, 2015

(54) POLYOLEFIN COMPOSITIONS AND ARTICLES MANUFACTURED THEREFROM

(71) Applicants: Equistar Chemicals, LP, Houston, TX (US); Basell Poliolefine Italia, S.r.l., Milan (IT)

(72) Inventors: Fabio Ceccarani, Youngstown, OH (US); Paolo Goberti, Ferrara (IT)

(73) Assignee: Equistar Chemicals, LP, Houston, TX (US)

(*) Notice: Subject to any disclaimer, the term of this patent is extended or adjusted under 35 U.S.C. 154(b) by 0 days.

(21) Appl. No.: 13/962,328

(22) Filed: Aug. 8, 2013

(65) Prior Publication Data

US 2014/0045998 A1    Feb. 13, 2014

Related U.S. Application Data

(60) Provisional application No. 61/682,053, filed on Aug. 10, 2012.

(51) Int. Cl.
*C08L 23/06*    (2006.01)
*C08L 23/12*    (2006.01)
*C08L 23/16*    (2006.01)

(52) U.S. Cl.
CPC ..................... *C08L 23/06* (2013.01)
USPC .................. 525/191; 525/232; 525/240

(58) Field of Classification Search
CPC ......... C08L 23/06; C08L 23/12; C08L 23/16; C08L 2205/03; C08L 2205/025; C08L 2203/16; C08L 2207/062
USPC .......................... 525/191, 232, 240
See application file for complete search history.

(56) References Cited

U.S. PATENT DOCUMENTS

| | | | |
|---|---|---|---|
| 6,207,754 B1 * | 3/2001 | Yu ................................. | 525/133 |
| 6,809,153 B2 * | 10/2004 | Jeong et al. .................... | 525/191 |
| 7,456,231 B2 * | 11/2008 | Jackson et al. ................ | 522/112 |
| 7,592,393 B2 | 9/2009 | Pelliconi et al. | |
| 8,293,348 B2 | 10/2012 | Yuno et al. | |
| 2008/0254308 A1 | 10/2008 | Thomasson et al. | |
| 2009/0030098 A1 | 1/2009 | Cagnani et al. | |

FOREIGN PATENT DOCUMENTS

| | | |
|---|---|---|
| EP | 1625174 A1 | 2/2006 |
| JP | 2009096154 A | 5/2009 |

OTHER PUBLICATIONS

PCT International Search Report and the Written Opinion—Mailed Oct. 22, 2013—for Corresponding PCT PCT/US2013/054105.

* cited by examiner

*Primary Examiner* — Nathan M Nutter

(57) ABSTRACT

The present invention is a polyolefin composition, which comprises a thermoplastic olefin polymer and a polyethylene. The thermoplastic olefin polymer (TPO) comprises a polypropylene and an olefin copolymer and is present in an amount of about 10 weight percent to about 50 weight percent; the TPO has a density in the range of about 0.85 g/cm³ to about 0.92 g/cm³ and a flexural modulus of less than about 700 MPa as measured by ISO 178. The polyethylene is either a medium density polyethylene or a high density polyethylene and present in an amount of about 50 weight percent to about 90 weight percent. The polyolefin composition is useful for preparing articles of manufacture such as sheets, roofing membranes, geomembranes, soft skins, drawn tapes, drawn fibers, and drawn filaments.

15 Claims, No Drawings

POLYOLEFIN COMPOSITIONS AND ARTICLES MANUFACTURED THEREFROM

CROSS REFERENCE TO RELATED APPLICATIONS

This application claims benefit of priority of U.S. Provisional Application No. 61/682,053 filed on Aug. 10, 2012, the contents of which are incorporated herein by reference in its entirety.

FIELD OF THE INVENTION

This invention relates to a polyolefin composition. More particularly, it relates to a polyolefin composition for use in preparing sheets, which composition comprises a thermoplastic olefin polymer and a medium density or a high density polyethylene. The polyolefin composition is particularly useful in preparing geomembranes.

BACKGROUND

Medium density polyethylene (MDPE) and high density polyethylene (HDPE) are widely used in polyolefin-based geomembrane applications. Those polyolefin compositions are relatively low cost. They have good physical property balances, chemical resistance, and ultraviolet (UV) weathering performance. They are easily processed in blown film and flat die extrusion processes.

However, an improvement in certain physical properties is often desired. Such properties include flexibility, impact resistance, dimensional stability, environmental stress cracking resistance (ESCR), and temperature resistance. Notably, geomembranes made with MDPE or HDPE tend to lack flexibility and impact resistance, especially in cold climate or cold environment applications.

Highly flexible elastoplastic polymer compositions provide an effective alternative to MDPE and HDPE for polyolefin-based geomembrane applications. Highly flexible elastoplastic polymer compositions provide a unique combination of flexibility, mechanical toughness, dimensional stability, barrier properties, and ESCR.

Highly flexible elastoplastic polymer compositions useful in geomembranes are taught in U.S. Pat. No. 5,286,564, U.S. Pat. No. 7,592,393, and United States Patent Application Publication No. US 2010/0305276. They have high flexibility, good chemical inertia, and good mechanical properties.

U.S. Pat. No. 5,286,564 describes highly flexible elastoplastic polymer compositions comprising, in parts by weight: A) 10-50 parts of an isotactic propylene homopolymer or copolymer, B) 5-20 parts of an ethylene copolymer fraction, insoluble in xylene at room temperature; and C) 40-80 parts of an ethylene copolymer fraction containing less than 40% by weight of ethylene, the fraction being also soluble in xylene at room temperature, and having an intrinsic viscosity from 1.5 to 4 dl/g; with a percentage by weight of the sum of the (B) and (C) fractions with respect to the total polyolefin composition from 50% to 90%, and a (B)/(C) weight ratio lower than 0.4. The compositions show a flexural modulus of less than 150 MPa and low values of Shore hardness.

U.S. Pat. No. 7,592,393 describes highly flexible elastoplastic polymer compositions comprising the following components, all percent amounts being by weight: A) 8-25% of a propylene homopolymer or copolymer; B) 75-92% of an elastomeric fraction comprising a first and a second elastomeric copolymer of propylene with other alpha-olefin(s), in a weight ratio from 1:5 to 5:1. The copolymers contain 45% or less of such alpha-olefin(s) and having specified values of solubility in xylene at room temperature and of intrinsic viscosity of the xylene-soluble fraction.

Such compositions show lower values of flexural modulus than the compositions disclosed in U.S. Pat. No. 5,286,564.

United States Patent Application Publication No. 2010/0305276 teaches a highly flexible elastoplastic polymer composition having an unusual and favorable balance of flexibility (low flexural modulus), softness and tensile properties, which is obtained when a specific copolymer of propylene with hexene-1 is combined with an ethylene copolymer having a high solubility in xylene at room temperature.

The polyolefin composition comprises the following components, all percent amounts being by weight: A) 15-40%, preferably 21-35%, more preferably 25-35%, in particular 26-35%, of a copolymer of propylene with hexene-1 containing from 2.5 to 10%, preferably from 6 to 10% of hexene-1 and having Melt Flow Rate (MFR, measured according to ISO 1133 at 230 degrees Celsius/2.16 kg) from 0.5 to 100 g/10 min. preferably from 0.5 to 70 g/10 min., more preferably from 2 to 70 g/10 min., in particular from 3 to 70 g/10 min.; B) 60-85%, preferably 65-79%, more preferably 65-75%, in particular 65-74%, of a copolymer of ethylene with propylene or a $CH_2=CHR$ alpha-olefin, where R is a C2-C8 alkyl radical, and optionally minor quantities of a diene, or a copolymer of ethylene with propylene and the alpha-olefin, and optionally minor quantities of a diene, the copolymers containing ethylene in a quantity equal to or lower than 40%, preferably from 15 to 40%, more preferably from 15 to 37%, and having solubility in xylene at room temperature greater than 70%, preferably greater than 80%, more preferably greater than 85%.

The amounts of (A) and (B) are referred to the total weight of the polymeric portion of the polyolefin composition.

It is desirable for MDPE- and HDPE-based compositions to be useful in preparing geomembranes and achieve physical property improvements similar to those of fPP-based geomembranes.

SUMMARY OF THE INVENTION

The present invention is a polyolefin composition, which is a polyethylene-based composition. It comprises a thermoplastic olefin polymer and a polyethylene.

The thermoplastic olefin polymer is present in an amount sufficient to improve the physical properties of the polyethylene-based composition. The thermoplastic olefin polymer is present in an amount of about 10 weight percent to about 50 weight percent. It has a density in the range of about 0.85 g/cm3 to about 0.92 g/cm3 and a flexural modulus of less than about 700 MPa as measured by ISO 178. It comprises a polypropylene and an olefin copolymer.

The polyethylene is either a medium density polyethylene (MDPE) having a density in the range of about 0.926 g/cm3 to about 0.940 g/cm3 or a high density polyethylene (HDPE) having a density of greater than or equal to 0.941 g/cm3. The polyethylene is present in an amount of about 50 weight percent to about 90 weight percent.

The polyolefin composition is useful for preparing articles of manufacture such as sheets, roofing membranes, geomembranes, soft skins, drawn tapes, drawn fibers, and drawn filaments. It is particularly useful for preparing geomembranes.

DETAILED DESCRIPTION

Definitions

In the present description, "room temperature" refers to a temperature around 25 degrees Celsius.

"Molecular Weight Distribution (Mw/Mn)" is measured by Gel Permeation Chromatography (GPC).

Hexene-1, ethylene, and butene-1 contents are determined by IR spectroscopy.

Solubility in xylene is determined by the following procedure: 2.5 g of polymer and 250 ml of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then left to reach 100° C. (heating switched off) and then placed in thermostatic water bath at 25 degrees Celsius for 30 minutes as well. The so formed solid is filtered on quick filtering paper. 100 ml of the filtered liquid is poured in a previously weighed aluminium container, which is heated on a heating plate under nitrogen flow, to remove the solvent by evaporation. The container is then kept on an oven at 80 degrees Celsius under vacuum until constant weight is obtained. The weight percentage of polymer soluble in xylene at room temperature is then calculated.

Intrinsic Viscosity (I.V.) is determined in tetrahydronaphthalene at 135 degrees Celsius.

Density is determined according to ISO 1183.

Flexural modulus is determined according to ISO 178.

Shore A and D is determined according to ISO 868.

Melt Flow Rate (MFR) is determined according to ISO 1133.

In a first embodiment, the present invention is a polyolefin composition, which is a polyethylene-based composition. It comprises a thermoplastic olefin polymer and a polyethylene.

The thermoplastic olefin polymer is present in an amount sufficient to improve the physical properties of the polyethylene-based composition. The thermoplastic olefin polymer is present in an amount of about 10 weight percent to about 50 weight percent. It has a density in the range of about 0.85 g/cm3 to about 0.92 g/cm3 and a flexural modulus of less than about 700 MPa as measured by ISO 178. Preferably, the flexural modulus is less than about 400 MPa. It comprises a polypropylene and an olefin copolymer.

The polypropylene is a homopolymer of propylene or a copolymer of propylene containing over about 80 weight percent propylene, in particular over about 85 weight percent propylene. In the copolymer, the comonomer is preferably ethylene or a CH2=CHR olefin where R is a 2-8 carbon alkyl radical, or a combination thereof. The total amount of comonomer(s) in the copolymer of propylene is preferably from about 0.1 weight percent to about 4 weight percent, referred to the total weight of the copolymer.

Moreover, such copolymer is typically semicrystalline, as it has a crystalline melting point and has a stereoregularity of isotactic type.

Preferably, the copolymer exhibits one of the following features: a solubility in xylene at room temperature below 30% by weight, preferably below 16% by weight; melting temperature from 125 to 150 degrees Celsius, more preferably from 130 to 150 degrees Celsius.

The molecular weight distribution, Mw/Mn, measured by Gel Permeation Chromatography, is of from 3.5 to 10, preferably from 4 to 6. The polypropylene has a Melt Flow Rate of from 0.5 to 50, preferably from 3 to 30, and a xylene insoluble at 25 degrees Celsius of greater than or equal to 94, and preferably greater than or equal to 96%.

The polypropylene can be prepared by sequential polymerization in at least two stages, in the presence of Ziegler-Natta catalyst supported on a magnesium halide in active form.

Preferably, the catalyst contains, as an essential element, a solid catalyst component comprising a titanium compound having at least one titanium-halogen bond and an electron donor compound, both supported on a magnesium halide in active form, and are characterized in that they are capable of producing propylene polymers having a xylene insoluble fraction at 25 degrees Celsius greater than or equal 94%, preferably greater than or equal to 96%, and have a sensitivity to molecular weight regulators high enough to produce propylene homopolymer having a melt flow rate (MFR) of less than or equal to 0.5 and greater than or equal to 50 g/10 min.

Methods of preparing the polypropylene are described in U.S. Pat. No. 5,286,791, the description of which is incorporated herein by reference.

The olefin copolymer is selected from the group consisting of (a) a copolymer of ethylene with propylene or a CH2=CHR olefin where R is a 2-8 carbon alkyl radical, and optionally minor quantities of a diene, or (b) a copolymer of ethylene, propylene, and a CH2=CHR olefin where R is a 2-8 carbon alkyl radical, and optionally minor quantities of a diene, the copolymers containing ethylene in a quantity from about 16 weight percent to about 85 weight percent and having solubility in xylene at room temperature greater than about 70 weight percent.

Whenever present, the amount of diene in copolymer (b) is preferably from 1 to 10% by weight with respect to the total weight of copolymer (b). Examples of dienes are butadiene, 1,4-hexadiene, 1,5-hexadiene, and ethylidene-1-norbornene.

The copolymer (b) has preferably a density from 0.855 to 0.885 g/cm3.

The copolymers (a) and (b) can be obtained with polymerization processes carried out in the presence of stereospecific Ziegler-Natta catalysts supported on magnesium dihalides, in particular magnesium dichloride.

The polymerization process, which can be continuous or batch, is carried out following known techniques and operating in liquid phase, in the presence or not of inert diluent, or in gas phase, or by mixed liquid-gas techniques.

Polymerization reaction time, pressure and temperature are not critical, however it is best if the temperature is from 20 to 100 degrees Celsius. The pressure can be atmospheric or higher.

The regulation of the molecular weight, resulting into the Melt Flow Rate values, is carried out by using known regulators, hydrogen in particular.

The stereospecific polymerization catalysts comprise the product of the reaction between: 1) a solid component, containing a titanium compound and an electron-donor compound (internal donor) supported on magnesium dihalide (preferably chloride); 2) an aluminum alkyl compound (cocatalyst); and, optionally, 3) an electron-donor compound ( The catalysts are preferably capable of producing homopolymers of propylene having an isotactic index higher than 90% (measured as weight amount of the fraction insoluble in xylene at room temperature).

The solid catalyst component (1) contains as electron-donor a compound generally selected among the ethers, ketones, lactones, compounds containing N, P and/or S atoms, and mono- and dicarboxylic acid esters.

Catalysts having the above mentioned characteristics are well known in the patent literature; particularly advantageous are the catalysts described in U.S. Pat. No. 4,399,054 and European Patent No. 0045977.

Particularly suited among the electron-donor compounds are phthalic acid esters and succinic acid esters.

Suitable succinic acid esters are represented by the formula (I):

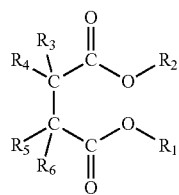

wherein the radicals $R_1$ and $R_2$, equal to or different from each other, are a $C_2$-$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_2$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle.

$R_1$ and $R_2$ are preferably $C_2$-$C_8$ alkyl, cycloalkyl, aryl, arylalkyl and alkylaryl groups. Particularly preferred are the compounds in which R1 and R2 are selected from primary alkyls and in particular branched primary alkyls. Examples of suitable R1 and R2 groups are methyl, ethyl, n-propyl, n-butyl, isobutyl, neopentyl, and 2-ethylhexyl. Particularly preferred are ethyl, isobutyl, and neopentyl.

One of the preferred groups of compounds described by the formula (I) is that in which R3 to R5 are hydrogen and R6 is a branched alkyl, cycloalkyl, aryl, arylalkyl and alkylaryl radical having from 3 to 10 carbon atoms. Another preferred group of compounds within those of formula (1) is that in which at least two radicals from R3 to R6 are different from hydrogen and are selected from C1-C20 linear or branched alkyl, alkenyl, cycloalkyl, aryl, arylalkyl or alkylaryl group, optionally containing heteroatoms. Particularly preferred are the compounds in which the two radicals different from hydrogen are linked to the same carbon atom. Furthermore, also the compounds in which at least two radicals different from hydrogen are linked to different carbon atoms, that is R3 and R5 or R4 and R6 are particularly preferred. Other electron-donors particularly suited are the 1,3-diethers, as illustrated in published European Patent Application Nos. 361493 and 728769.

As cocatalysts (2), one preferably uses the trialkyl aluminum compounds, such as Al-triethyl, Al-triisobutyl and Al-tri-n-butyl.

The electron-donor compounds (3) that can be used as external electron-donors (added to the Al-alkyl compound) comprise the aromatic acid esters (such as alkylic benzoates), heterocyclic compounds (such as the 2,2,6,6-tetramethylpiperidine and the 2,6-diisopropylpiperidine), and in particular silicon compounds containing at least one Si—OR bond (where R is a hydrocarbon radical).

Examples of the silicon compounds are those of formula Ra1R2Si(OR3)c, where a and b are integer numbers from 0 to 2, c is an integer from 1 to 3 and the sum (a+b+c) is 4; R1, R2, and R3 are alkyl, cycloalkyl or aryl radicals with 1-18 carbon atoms optionally containing heteroatoms.

Thexyltrimethoxysilane (2,3-dimethyl-2-trimethoxysilyl-butane) is particularly preferred. In particular, thexyltrimethoxysilane is preferably used for preparing the copolymer (a). The 1,3-diethers are also suitable to be used as external donors. In the case that the internal donor is one of the 1,3-diethers, the external donor can be omitted. Other catalysts that may be used are metallocene-type catalysts, as described in U.S. Pat. No. 5,324,800 and European Patent Application No. 0129368; particularly advantageous are bridged bis-indenyl metallocenes, for instance as described in U.S. Pat. No. 5,145,819 and European Patent Application No. 0485823. Another class of suitable catalysts are the so-called constrained geometry catalysts, as described in European Patent Application Nos. 0416815, 0420436, 0671404, and 0643066 and PCT Publication No. WO 91/04257. These metallocene compounds may be used in particular to produce the copolymer (b).

The catalysts may be precontacted with small quantities of olefin (prepolymerization), maintaining the catalyst in suspension in a hydrocarbon solvent, and polymerizing at temperatures from room to 60 degrees Celsius, thus producing a quantity of polymer from 0.5 to 3 times the weight of the catalyst.

The operation can also take place in liquid monomer, producing, in this case, a quantity of polymer up to 1000 times the weight of the catalyst.

The composition of the present invention can be prepared by mixing copolymers (a) and (b) in the fluid state, i.e., at temperatures greater than their softening or melting point, or by sequential polymerization in two or more stages in the presence of the highly stereospecific Ziegler-Natta catalysts and/or metallocene-type catalysts.

The mentioned sequential polymerization process for the production of the composition of the present invention generally comprises at least two stages, where in the first stage or stages propylene and hexene-1 are polymerized, optionally in the presence of ethylene and/or the alpha-olefin as comonomer(s), to form copolymer (a), and in the subsequent stage(s) mixtures of ethylene/propylene and/or an other alpha-olefin and optionally a diene are polymerized to form copolymer (b).

The sequential polymerization is carried out in either liquid, gas, or liquid/gas phase. It is preferable to carry out the polymerization in gas phase.

The reaction temperature in the various stages of polymerization can be equal or different, and generally ranges from 40 to 90 degrees Celsius, preferably from 50 to 80 degrees Celsius for copolymer (a), and from 40 to 60 degrees Celsius for copolymer (b).

Examples of sequential polymerization processes are described in European Patent Application 0472946.

Examples of preparation of the copolymer (b) in a single step polymerization in hydrocarbon solution are described in PCT Publication No. WO2007/057361.

The MFR values, measured according to ISO 1133, at 230 degrees Celsius/2.16 kg of the composition of the present invention are generally from 0.4 to 30 g/10 min, preferably from 0.6 to 15 g/10 min.

The desired MFR values for the composition of the present invention can be obtained directly in polymerization by adequately regulating the molecular weight regulator (hydrogen, for example) or subjecting the polymer components or composition to visbreaking.

The polymer chain scissioning or visbreaking is carried out by using well known techniques. One of them consists of using peroxides which are added in sufficient quantities to the polymer or polymer composition to provide the desired degree of visbreaking, upon heating, generally in an extruder.

The peroxides which are most conveniently used in the polymer or polymer composition visbreaking process have a decomposition temperature preferably ranging from 150 degrees Celsius to 250 degrees Celsius. Examples of the peroxides are di-tert-butyl peroxide, dicumyl peroxide, 2,5-dimethyl-2,5-di(tert-butylperoxy)hexyne and Luperox 101 2,5-dimethyl-2,5-di(tert-butylperoxy)hexane, all of which are commercially available.

The quantity of peroxide necessary for the visbreaking process preferably ranges from 0.001 to 1.5% by weight of the polymer or polymer composition, more preferably from 0.002 to 0.6%.

The composition of the present invention can also contain additives, fillers and pigments commonly used for olefin polymers, such as, for example, nucleating agents, extension oils, mineral fillers, organic and inorganic pigments.

Preferably, the olefin copolymer has a propylene content in the range of about 75 weight percent to about 96 weight percent and a MFR of less than about 100 g/10 min as measured by ISO 1133-1:2011 at 230 degrees Celsius/2.16 kg. More preferably, the olefin copolymer has a MFR in the range of about 0.05 g/10 min to about 40 g/10 min as measured by ISO 1133-1:2011 at 230 degrees Celsius/2.16 kg.

Preferably, the olefin copolymer has a density in the range of about 0.857 g/cm3 to about 0.908 g/cm3 and a MFR of less than about 30 g/10 min as measured by ISO 1133-1:2011 at 190 degrees Celsius/21.6 kg.

Preferably, the olefin copolymer contains ethylene in a quantity less than or equal to about 40 weight percent.

Preferably, the thermoplastic olefin polymer is a heterophasic composition prepared by sequential polymerization in at least two stages selected from the group consisting of (a) an olefin polymer composition consisting essentially of
(i) from about 10 percent to about 60 percent, preferably 20 to 50%, of a propylene homopolymer with isotactic index in the range of about 90 percent to about 99 percent, or a crystalline propylene copolymer with ethylene, with a CH2=CHR olefin where R is a 2-8 carbon alkyl radical, or combinations thereof, containing over about 85 weight percent of propylene and having an isotactic index in the range of about 85 percent to about 99 percent, (ii) from about 8 percent to about 40 percent of a semi-crystalline, ethylene copolymer fraction containing ethylene and propylene, having an ethylene content of greater than 50 percent and insoluble in xylene at room temperature, and (iii) from about 30 percent to about 60 percent, preferably 30 to 50%, of an amorphous ethylene-propylene copolymer fraction, optionally containing small proportions of a diene, preferably 1-10% of a diene, more preferably 1 to 5% of a diene, soluble in xylene at room temperature and containing about 40 weight percent to about 70 weight percent ethylene, and (b) an olefin polymer composition consisting essentially of
(i) from about 10 percent to about 50 percent, preferably 10 to 40%, and most preferably 20 to 35%, of a propylene homopolymer having an isotactic index greater than about 80, preferably 85 to 99%, or a copolymer selected from the group consisting of (A) propylene and ethylene, (B) propylene, ethylene, and a CH2=CHR alpha-olefin where R is a C2-8 straight or branched alkyl, and (C) propylene and a CH2=CHR alpha-olefin where R is a C2-8 straight or branched alkyl, the copolymer containing over about 80 percent, preferably from 85 to 99%, and most preferably from 90 to 99%, propylene and having an isotactic index greater than about 80, preferably greater than 85 to 99%, (ii) less than or equal to about 20 percent, preferably 5 to 20%, more preferably 7 to 15%, of a copolymer fraction insoluble in xylene at room or ambient temperature; and (iii) from about percent 40 to about 80 percent, preferably 50 to 70%, of a copolymer fraction selected from the group consisting of a copolymer of (A) ethylene and propylene, wherein the copolymer contains from about 20 percent to less than about 40 percent, preferably 25 to 38%, ethylene, (B) ethylene, propylene, and a CH2=CHR alpha-olefin where R is a C2-8 straight or branched alkyl, the alpha-olefin is present in an amount of about 1 percent to about 10 percent, and the amount of ethylene and alpha-olefin present is from about 20 percent to less than about 40 percent, preferably 25 to 38%, and (C) ethylene and a CH2=CHR alpha-olefin where R is a C2-8 straight or branched alkyl containing from 20% to less than 40% of the alpha-olefin, and optionally with about 0.5 percent to about 10 percent, preferably 1 to 5%, of a diene, the copolymer fraction being soluble in xylene at ambient temperature, and having an intrinsic viscosity of from about 1.5 dl/g to about 10.0 dl/g, preferably 1.5 to 5.0 dl/g; more preferably 1.5 to 4.0 dl/g, most preferably from 1.7 to 3.0 dl/g, wherein the total of the (bii) and (biii) fractions, based on the total olefin polymer composition, is from 50% to 90%, preferably 65% to 80%, and the weight ratio of (bii)/(biii) being less than 0.4, preferably 0.1 to 0.3.

Preferably, component (b)(ii) is selected from the group consisting of (A) ethylene and propylene containing over about 55 percent ethylene, preferably from 55 to 99%, (B) ethylene, propylene, and a CH2=CHR alpha-olefin where R is a C2-8 straight or branched alkyl, containing from about 1 percent to about 10 percent of the alpha-olefin and over about 55 percent up to 98%, preferably from 80 to 95%, of both ethylene and alpha-olefin, and (C) ethylene and a CH2=CHR alpha-olefin where R is a C2-8 straight or branched alkyl, containing over about 55 percent up to 98%, preferably from 80 to 95%, of the alpha-olefin.

Component (b) is the preferred heterophasic olefin polymer composition used in the blends of the present invention.

The C4-C10 alpha-olefin useful in the preparation of components (a) and (b) described above include butene-1, pentene-1, hexene-1, 4-methyl-1-pentene and octene. Butene-1 is particularly preferred.

The diene, when present, in components (a) and (b), is typically a butadiene, 1,4-hexadiene, 1,5-hexadiene, or ethylidene norbornene diene monomer.

Preferably, the thermoplastic olefin polymer has an ethylene content in the range of about 15 weight percent to about 50 weight percent.

Preferably, the thermoplastic olefin polymer has a xylene soluble (XS) content at room temperature of greater than about 30 weight percent, more preferably greater than about 60 weight percent.

The polyethylene is either a medium density polyethylene (MDPE) having a density in the range of about 0.926 g/cm3 to about 0.940 g/cm3 or a high density polyethylene (HDPE) having a density of greater than or equal to 0.941 g/cm3. The polyethylene is present in an amount of about 50 weight percent to about 90 weight percent.

HDPE is manufactured using either only ethylene as a monomer for the polymer chains (HDPE Homopolymer) or using low amounts of co-monomers (normally butene or hexene), and linear polymer chains with short-chain branches are obtained. MDPE is similar to HDPE but by copolymerizing the ethylene monomer with higher amounts of an alkybranched co-monomer (butene, hexene, or octene), a copolymer PE is produced in which hydrocarbon branches replace some of the hydrogen atoms bonded to the carbon atoms. The distinction between MDPE and LLDPE is a result of the degree of copolymerization, ultimately affecting the density of the polymer (the higher the short-chain branching, the lower the density), with LLDPE being significantly more flexible than MDPE and HDPE.

In an additional embodiment, the thermoplastic olefin polymer has a density preferably from 0.850 g/cm3 to 0.890 g/cm3, and more preferably from 0.855 g/cm3 to 0.885 g/cm3. It preferably displays no or relatively low degree of crystallinity, indicatively from 0 to 35% measured by X-ray. It preferably has a hardness (Shore D, ISO 868) less than or equal to 90 points, more preferably less than or equal to 70 points, and most preferably less than or equal to 40 points. It preferably has a melting point, measured by differential scanning calorimetry (DSC) at a heating/cooling rate of 10-20 degrees Celsius/min, of 142 degrees Celsius or less, and more preferably of 90 degrees Celsius or less. It preferably has a heat of fusion, measured with DSC under the above conditions, of 75 J/g or less. It preferably has a molecular weight distribution, Mw/Mn, measured by gel permeation chromatography in trichlorobenzene at 135 degrees Celsius, from 1.5 to 15, more preferably from 1.5 to 10, and most preferably from 2.5 to 10. It preferably has a melt flow rate (MFR, measured at 230 degrees Celsius, 2.16 kg) from 0.1 dg/min to 3 dg/min, and more preferably from 0.5 dg/min to 2.5 dg/min. It preferably has a flexural modulus (ISO 178A) less than 200 MPa, more preferably from 50 to 170, and most preferably from 75 to 125. It preferably has a tensile strength at break from 2 MPa to 50 MPa, and more preferably from 5 MPa to 20 MPa. It preferably has a tensile elongation at break from 450% to 900%, and more preferably from 600% to 800%.

Suitable thermoplastic olefin polymer also includes the so-called plastomers. Plastomers are generally produced by single-site catalysts. Suitable plastomers include propylene copolymers containing up to 40 weight percent of an olefin comonomer. Preferably, the plastomer comprises from 0.1 weight percent to 40 weight percent, more preferably from 0.1 weight percent to 25 weight percent of olefin comonomers selected from the group consisting of ethylene, C4-C8 .alpha.-olefin, and mixtures thereof. Ethylene is a particularly preferred comonomer.

Many thermoplastic olefin polymers are commercially available and suitable for use in the invention. Examples include Adflex™, Hifax™, and Softell™ resins from LyondellBasell Industries, Versify™ elastomers and plastomers from The Dow Chemical Company, Vistamaxx™ elastomers from ExxonMobil Chemical, the like, and mixtures thereof.

In a third embodiment, the present invention is an article of manufacture prepared from a polyolefin composition wherein the article is a sheet, a roofing membrane, a geomembrane, a soft skin, a drawn tape, a drawn fiber, or a drawn filament. Preferably, the article of manufacture is a geomembrane.

More preferably, the geomembrane is prepared from a polyolefin composition comprising (a) about 10 weight percent to about 50 weight percent of a thermoplastic olefin polymer having a density in the range of about 0.85 g/cm3 to about 0.92 g/cm3 and a flexural modulus of less than about 700 MPa as measured by ISO 178:2010, which thermoplastic olefin polymer comprises a polypropylene and an olefin copolymer, and (b) about 50 weight percent to about 90 weight percent of a polyethylene having a density greater than about 0.926 g/cm3.

EXAMPLES

The following non-limiting examples illustrate the invention.

The following HDPE and MDPE commercial grades produced by LyondellBasell Industries were used as the base PE materials for this study: (a) HDPE—LUPOLEN™ 5021DX polyethylene (density=0.950 g/cm3) and (b) MDPE—LUPOLEN™ 3721C polyethylene (density=0.937 g/cm3). The following commercial grade was used as a comparative modifier: LLDPE—CLEARFLEX™ FG 106 linear low density polyethylene (ethylene-hexene copolymer, density=0.918 g/cm3).

The exemplary highly flexible elastoplastic polymer composition was made of: (a) about 30 weight percent of a copolymer of propylene with ethylene, containing about 3.2 weight percent of ethylene, and (b) about 70 weight percent of a copolymer of ethylene with propylene, containing about 27 weight percent of ethylene and having solubility in xylene at room temperature of about 90 weight percent. The xylene-soluble fraction of (b) has an intrinsic value of 3.2 dl/g, measured in tetrahydronapthalene at 135° C.

Herein the exemplary highly flexible elastoplastic polymer is referred to as a flexible polypropylene ("fPP"). The term "flexible polypropylene" is used typically in reference to geomembrane applications, which is a primary application taught in this application.

Each modifier was blended with each base PE material at levels of both 20 weight percent and 40 weight percent. The blended, polyolefin compositions further contained carbon black, UV stabilizers (HALS), and primary and secondary antioxidants to simulate commercial geomembrane formulations and provide UV stability during accelerated weathering testing.

The blended, polyolefin compositions were pelletized using a Berstorff ZE25 25 mm twin screw extruder with a strand pelletizing system.

Two types of specimens were prepared from the pellets. One set was compression molded, and the other was from extruded sheets.

Compression molded specimens were prepared because polyethylene-based compositions are generally tested in that form. Specimens were molded on a COLLIN 200M press according to the ISO 293 standard. The tests for the compression molded specimens included: (a) Notched Izod Impact (ISO 180), (b) Flexural Modulus (ISO 178), (c) Vicat Softening Point (ISO 306), and (d) Environmental Stress Cracking Resistance (ESCR) (ASTM D 1693).

The sheet specimens were die cut from 1 mm (40 mil) thick sheet. The tests for the sheet specimens included: (a) Tensile Properties (ISO 527-3; 500 mm/min) and (b) Weldability Window.

TABLE 1

| | | HDPE Blends (Compression Molded Specimen) | | | | | |
|---|---|---|---|---|---|---|---|
| Physical Property | Units | C.E. 1 fPP | C.E. 2 HDPE | Ex. 3 +20 wt % fPP | Ex. 4 +40 wt % fPP | C.E. 5 +20 wt % LLDPE | C.E. 6 +40 wt % LLDPE |
| Izod Impact at −30° C. | kJ/m² | 79.6 | 4.0 | 7.2 | 74.6 | 6.0 | 6.9 |
| Izod Impact at −40° C. | kJ/m² | 81.7 | 4.2 | 6.4 | 15.7 | 5.4 | 6.4 |

TABLE 1-continued

HDPE Blends (Compression Molded Specimen)

| Physical Property | Units | C.E. 1 fPP | C.E. 2 HDPE | Ex. 3 +20 wt % fPP | Ex. 4 +40 wt % fPP | C.E. 5 +20 wt % LLDPE | C.E. 6 +40 wt % LLDPE |
|---|---|---|---|---|---|---|---|
| Flexural Modulus | MPa | 85 | 1176 | 785 | 410 | 945 | 760 |
| Vicat Softening Temperature | °C. | 55.2 | 125 | 121 | 96 | 122 | 117 |

TABLE 2

MDPE Blends (Compression Molded Specimen)

| Physical Property | Units | C.E. 1 fPP | C.E. 7 MDPE | Ex. 8 +20 wt % fPP | Ex. 9 +40 wt % fPP | C.E. 10 +20 wt % LLDPE | C.E. 11 +40 wt % LLDPE |
|---|---|---|---|---|---|---|---|
| Izod Impact at −30° C. | kJ/m² | 79.6 | 5.3 | 26.8 | 87.8 | 7.1 | 10.7 |
| Izod Impact at −40° C. | kJ/m² | 81.7 | 5.7 | 10.4 | 67.0 | 6.4 | 8.4 |
| Flexural Modulus | MPa | 85 | 712 | 480 | 330 | 579 | 538 |
| Vicat Softening Temperature | °C. | 55.2 | 118 | 111 | 91.5 | 116 | 112 |

Impact testing determines a material's toughness and resistance to puncture by impact. Impact strength is used to evaluate how much energy is required to break the impacted specimen.

Tables 1 and 2 show that the low temperature Izod impact strength of fPP is approximately 20 times higher than that of HDPE or MDPE. Moreover, the tables show that a large improvement in low temperature Izod is obtained by blending in 20% and especially 40% fPP. Much smaller improvements in impact resistance are obtained by using LLDPE at either 20% or 40% as modifier.

The flexural modulus of a membrane's material affects the ability to prefabricate large sections in the manufacturing environment. A more flexible membrane will better conform to the substrate surface when the geomembrane is deployed and will be easier to install in cold climates.

Tables 1 and 2 show that fPP is about 14 times more flexible than HDPE and about 8 times more flexible than MDPE. The reduction in stiffness obtained by blending fPP at 20% is significant (a reduction of approximately 33%), but with 40% fPP, an even greater improvement is achieved (65% reduction blended with HDPE and 54% reduction blended with MDPE).

While the addition of LLDPE also provides an improvement in flexibility, it is not as efficient as fPP. The stiffness reduction obtained by blending in 40% LLDPE is less than the reduction obtained by blending in only 20% fPP.

Tables 1 and 2 show that HDPE/MDPE blends with fPP tend to have a decreased Vicat softening temperature, which can help to broaden the heat welding window of the material.

TABLE 3

ESCR of Blends

| Property | Units | C.E. 1 fPP | C.E. 7 MDPE | C.E. 2 HDPE | Ex. 3 +20 wt % fPP | Ex. 4 +40 wt % fPP | C.E. 5 +20 wt % LLDPE | C.E. 6 +40 wt % LLDPE |
|---|---|---|---|---|---|---|---|---|
| 10% Igepal | hours | >1600 | >1600 | 52 | >1600 | >1600 | 740 | >1600 |
| 100% Igepal | hours | >1600 | >1600 | 185 | >1600 | >1600 | >1600 | >1600 |

Unlike PE based materials, fPP is not prone to Environmental Stress Cracking, as confirmed in this study (ESCR>1600 hours). Table 3 shows that the tested MDPE performed very well (ESCR>1600 hours). However, the HDPE showed quite poor results at both 10% Igepal concentration (52 hours) and 100% Igepal concentration (185 hours).

The addition of fPP at the 20% level was enough to dramatically improve the ESCR performance of HDPE, bringing it to the same level as 100% fPP or 100% MDPE (ESCR>1600 hours). The addition of LLDPE also had a positive effect but not as great as fPP, since 40% addition of LLDPE was necessary to achieve the same effect as 20% fPP.

TABLE 4

HDPE Blends (Sheet Specimens)

| Physical Property | Units | C.E. 1 fPP | C.E. 2 HDPE | Ex. 3 +20 wt % fPP | Ex. 4 +40 wt % fPP | C.E. 5 +20 wt % LLDPE | C.E. 6 +40 wt % LLDPE |
|---|---|---|---|---|---|---|---|
| Tensile Strength at Yield MD | MPa | 7.7 | 25.4 | 18.3 | 14.2 | 21.6 | 18.6 |
| Tensile Elongation at Yield MD | % | 39.0 | 10.0 | 13.6 | 19.7 | 11.6 | 126 |
| Tensile Stress at Break MD | MPa | 22.1 | 20.8 | 30.2 | 29.3 | 27.7 | 29.7 |
| Tensile Elongation at Break MD | % | 850 | 747 | 739 | 805 | 700 | 690 |
| Tear Resistance MD | N | 76 | 140 | 124 | 108 | 134 | 124 |
| Tensile Strength at Yield TD | MPa | 7.0 | 27.7 | 18.1 | 13.1 | 22.7 | 19.3 |
| Tensile Elongation at Yield TD | % | 38.0 | 7.5 | 13.8 | 18.8 | 10.7 | 11.9 |
| Tensile Stress at Break TD | MPa | 22.4 | 15.8 | 16.5 | 23.2 | 21.8 | 30.7 |
| Tensile Elongation at Break TD | % | 850 | 310 | 765 | 795 | 827 | 830 |
| Tear Resistance TD | N | 74 | 170 | 146 | 122 | 156 | 139 |
| Puncture Resistance | N | 252 | 387 | 372 | 358 | 394 | 371 |

MD = Machine Direction;
TD = Transverse Direction

TABLE 5

MDPE Blends (Sheet Specimens)

| Physical Property | Units | C.E. 1 fPP | C.E. 2 MDPE | Ex. 3 +20 wt % fPP | Ex. 4 +40 wt % fPP | C.E. 5 +20 wt % LLDPE | C.E. 6 +40 wt % LLDPE |
|---|---|---|---|---|---|---|---|
| Tensile Strength at Yield MD | MPa | 7.7 | 19.0 | 143 | 12.0 | 16.4 | 14.9 |
| Tensile Elongation at Yield MD | % | 39.0 | 12.5 | 15.3 | 24.4 | — | 15.3 |
| Tensile Stress at Break MD | MPa | 22.1 | 31.6 | 30.7 | 28.7 | 32.1 | 32.1 |
| Tensile Elongation at Break MD | % | 850 | 685 | 738 | 808 | 722 | 753 |
| Tear Resistance MD | N | 76 | 120 | 104 | 99 | 128 | 119 |
| Tensile Strength at Yield TD | MPa | 7.0 | 20.6 | 14.4 | 11.0 | 17.3 | 15.8 |
| Tensile Elongation at Yield TD | % | 38.0 | 10.5 | 16.1 | 21.6 | 12.3 | 13.9 |
| Tensile Stress at Break TD | MPa | 22.4 | 32.4 | 24.8 | 24.7 | 32.3 | 29.5 |
| Tensile Elongation at Break TD | % | 850 | 820 | 751 | 807 | 820 | 828 |
| Tear Resistance TD | N | 74 | 139 | 117 | 104 | 136 | 127 |
| Puncture Resistance | N | 252 | 362 | 328 | 312 | 385 | 356 |

MD = Machine Direction;
TD = Transverse Direction

The tensile properties of a membrane provide practical indications about the behavior of the material when it is stretched during installation or in its service life. High tensile elongation at break demonstrates the ability of the polymer to be stretched prior to break and is a key property in geomembrane applications.

Tables 4 and 5 show that although fPP has lower tensile stress at yield than either HDPE or MDPE, an even higher elongation at break can be obtained with fPP. Thus, HDPE/MDPE blends with fPP have lower tensile stress at yield (between 2% and 30% lower with the addition of 20% fPP) but higher elongation at yield.

fPP has tensile stress at break similar to HDPE (slightly higher) and lower than MDPE. There seems to be a synergistic effect for tensile stress at break between HDPE and fPP—their blends have higher tensile stress at break than either the HDPE or the fPP alone.

In order to have a preliminary indication regarding whether the introduction of fPP affects the weldability of HDPE and MDPE, some sheet samples were welded with a hot wedge welding procedure using commercial equipment. Hot wedge welding is carried out by a hot wedge, which is normally heated to a temperature of 300-500° C. and pulled between the overlapping lower and upper geomembranes that need to be seamed.

A system of guide rollers provides a complete surface contact between the membranes and the two separate tracks of the dual hot wedge. The surface layers of the geomembranes are melted, and the two melt layers are pressed together by a squeeze roller system immediately behind the wedge. The membrane surfaces are united by the wedge-shaped arrangement and pressed together by the squeeze rollers immediately behind the wedge nose, realizing the seam. Hot wedge temperature, roller force and welding speed, as well as process engineering and welding parameters can be independently controlled and adjusted to the correct values needed for the particular plastic material being used.

Seam integrity and strength were evaluated according to ASTM D 6392. This test method requires that welded specimens are subjected to both T-peel and shear tests: (a) shear tests on welded coupons can verify if there is proper elongation of the material immediately adjacent to the weld; the shear test was considered complete once the specimen reached 50% elongation; and (b) the T-peel test verifies the degree of proper bonding of the weld and is performed at a speed of 50 mm/min.

fPP can be successfully welded at lower temperatures and higher speeds than HDPE/MDPE. HDPE/MDPE showed adhesion failure when welded at 400° C. while fPP could be successfully welded at high speed even at 360° C.

The weldability window of HDPE seems to shift to lower temperatures when blended with fPP or LLDPE. HDPE could be successfully welded at 400° C. when 40% fPP or 20% LLDPE were added.

What is claimed is:

1. A polyolefin composition comprising:
   (a) about 10 weight percent to about 50 weight percent of a thermoplastic olefin polymer having a density in the range of about 0.85 g/cm$^3$ to about 0.92 g/cm$^3$ and a flexural modulus of less than about 700 MPa as measured by ISO 178:2010, which thermoplastic olefin polymer comprises a polypropylene and an olefin copolymer, and
   (b) about 50 weight percent to about 90 weight percent of a polyethylene selected from the group consisting of
      (i) a high density polyethylene having a density of greater than or equal to 0.941 g/cm$^3$ and
      (ii) a medium density polyethylene having a density in the range of about 0.926 g/cm$^3$ to about 0.940 g/cm$^3$.

2. The polyolefin composition according to claim 1, wherein the olefin copolymer is selected from the group consisting of:
   (a) a copolymer of ethylene with propylene or a CH$_2$=CHR olefin where R is a 2-8 carbon alkyl radical, and optionally minor quantities of a diene, or
   (b) a copolymer of ethylene, propylene, and a CH$_2$=CHR olefin where R is a 2-8 carbon alkyl radical, and optionally minor quantities of a diene,
the copolymers containing ethylene in a quantity from about 16 weight percent to about 85 weight percent and having solubility in xylene at room temperature greater than about 70 weight percent.

3. The polyolefin composition according to claim 2, wherein the olefin copolymer has a propylene content in the range of about 75 weight percent to about 96 weight percent and a MFR of less than about 100 g/10 min as measured by ISO 1133-1:2011 at 230 degrees Celsius/2.16 kg.

4. The polyolefin composition according to claim 2, wherein the olefin copolymer has a density in the range of about 0.857 g/cm$^3$ to about 0.908 g/cm$^3$ and a MFR of less than about 30 g/10 min as measured by ISO 1133-1:2011 at 190 degrees Celsius/21.6 kg.

5. The polyolefin composition according to claim 2, wherein the olefin copolymer contains ethylene in a quantity less than or equal to about 40 weight percent.

6. The polyolefin composition according to claim 1 wherein the thermoplastic olefin polymer is a heterophasic composition prepared by sequential polymerization in at least two stages selected from the group consisting of:
   (a) an olefin polymer composition consisting essentially of:
      (i) from about 10 percent to about 60 percent of a propylene homopolymer with isotactic index in the range of about 90 percent to about 99 percent, or a crystalline propylene copolymer with ethylene, with a CH$_2$=CHR olefin where R is a 2-8 carbon alkyl radical, or combinations thereof, containing over about 85 weight percent of propylene and having an isotactic index in the range of about 85 percent to about 99 percent;
      (ii) from about 8 percent to about 40 percent of a semicrystalline, ethylene copolymer fraction containing ethylene and propylene, having an ethylene content of greater than 50 percent and insoluble in xylene at room temperature; and
      (iii) from about 30 percent to about 60 percent of an amorphous ethylene-propylene copolymer fraction, optionally containing small proportions of a diene, soluble in xylene at room temperature and containing about 40 weight percent to about 70 weight percent ethylene; and
   (b) an olefin polymer composition consisting essentially of:
      (i) from about 10 percent to about 50 percent of a propylene homopolymer having an isotactic index greater than about 80, or a copolymer selected from the group consisting of
         (A) propylene and ethylene,
         (B) propylene, ethylene, and a CH$_2$=CHR alpha-olefin where R is a C$_{2-8}$ straight or branched alkyl, and
         (C) propylene and a CH$_2$=CHR alpha-olefin where R is a C$_{2-8}$ straight or branched alkyl,
         the copolymer containing over about 80 percent propylene and having an isotactic index greater than about 80;
      (ii) less than or equal to about 20 percent of a copolymer fraction insoluble in xylene at room or ambient temperature; and
      (iii) from about percent 40 to about 80 percent of a copolymer fraction selected from the group consisting of a copolymer of
         (A) ethylene and propylene, wherein the copolymer contains from about 20 percent to less than about 40 percent ethylene,
         (B) ethylene, propylene, and a CH$_2$=CHR alpha-olefin where R is a C$_{2-8}$ straight or branched alkyl, the alpha-olefin is present in an amount of about 1 percent to about 10 percent, and the amount of ethylene and alpha-olefin present is from about 20 percent to less than about 40 percent, and
         (C) ethylene and a CH$_2$=CHR alpha-olefin where R is a C$_{2-8}$ straight or branched alkyl containing from 20% to less than 40% of the alpha-olefin, and optionally with about 0.5 percent to about 10 percent of a diene,
         the copolymer fraction being soluble in xylene at ambient temperature, and having an intrinsic viscosity of from about 1.5 dl/g to about 10.0 dl/g;
wherein the total of the (bii) and (biii) fractions, based on the total olefin polymer composition, is from 50% to 90%, and the weight ratio of (bii)/(biii) being less than 0.4.

7. The polyolefin composition according to claim 6, wherein the component (b)(ii) is selected from the group consisting of
   (A) ethylene and propylene containing over about 55 percent ethylene,
   (B) ethylene, propylene, and a CH$_2$=CHR alpha-olefin where R is a C$_{2-8}$ straight or branched alkyl, containing from about 1 percent to about 10 percent of the alpha-olefin and over about 55 percent of both ethylene and alpha-olefin, and
   (C) ethylene and a CH$_2$=CHR alpha-olefin where R is a C$_{2-8}$ straight or branched alkyl, containing over about 55 percent of the alpha-olefin.

8. The polyolefin composition according to claim 1 wherein the thermoplastic olefin polymer has a flexural modulus of less than about 400 MPa.

9. The polyolefin composition according to claim 2 wherein the olefin copolymer has a MFR in the range of about 0.05 g/10 min to about 40 g/10 min as measured by ISO 1133-1:2011 at 230 degrees Celsius/2.16 kg.

10. The polyolefin composition according to claim 1 wherein the thermoplastic olefin polymer has an ethylene content in the range of about 15 weight percent to about 50 weight percent.

11. The polyolefin composition according to claim 1 wherein the thermoplastic olefin polymer has a xylene soluble (XS) content at room temperature of greater than about 30 weight percent.

12. The polyolefin composition according to claim 11 wherein the XS content is greater than about 60 weight percent.

13. An article of manufacture prepared from a polyolefin composition comprising:
 (a) about 10 weight percent to about 50 weight percent of a thermoplastic olefin polymer having a density in the range of about 0.85 g/cm$^3$ to about 0.92 g/cm$^3$ and a flexural modulus of less than about 700 MPa as measured by ISO 178:2010, which thermoplastic olefin polymer comprises a polypropylene and an olefin copolymer, and
 (b) about 50 weight percent to about 90 weight percent of a polyethylene selected from the group consisting of
  (i) a high density polyethylene having a density of greater than or equal to 0.941 g/cm$^3$ and
  (ii) a medium density polyethylene having a density in the range of about 0.926 g/cm$^3$ to about 0.940 g/cm$^3$.

14. The article of manufacture according to claim 13 wherein the article is a sheet, a roofing membrane, a geomembrane, a soft skin, a drawn tape, a drawn fiber, or a drawn filament.

15. A geomembrane prepared from a polyolefin composition comprising:
 (a) about 10 weight percent to about 50 weight percent of a thermoplastic olefin polymer having a density in the range of about 0.85 g/cm$^3$ to about 0.92 g/cm$^3$ and a flexural modulus of less than about 700 MPa as measured by ISO 178:2010, which thermoplastic olefin polymer comprises a polypropylene and an olefin copolymer, and
 (b) about 50 weight percent to about 90 weight percent of a polyethylene having a density greater than about 0.926 g/cm$^3$.

* * * * *